US010223318B2

(12) United States Patent
Koriginja Ramaswamy et al.

(10) Patent No.: US 10,223,318 B2
(45) Date of Patent: Mar. 5, 2019

(54) HOT PLUGGING PERIPHERAL CONNECTED INTERFACE EXPRESS (PCIE) CARDS

(71) Applicant: HEWLETT PACKARD ENTERPRISE DEVELOPMENT LP, Houston, TX (US)

(72) Inventors: Srivani Kor Koriginja Ramaswamy, Houston, TX (US); Yiling Zhang, Houston, TX (US); Hoang Thanh Nguyen, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/610,611

(22) Filed: May 31, 2017

(65) Prior Publication Data

US 2018/0349310 A1    Dec. 6, 2018

(51) Int. Cl.
   *G06F 13/10*   (2006.01)
   *G06F 11/27*   (2006.01)
   *G06F 13/40*   (2006.01)

(52) U.S. Cl.
   CPC .......... *G06F 13/4081* (2013.01); *G06F 11/27* (2013.01); *G06F 13/10* (2013.01);
   (Continued)

(58) Field of Classification Search
   CPC ...... G06F 13/4081; G06F 11/27; G06F 13/10; G06F 2213/0026
   (Continued)

(56) References Cited

U.S. PATENT DOCUMENTS 6,976,118 B1 * 12/2005 Baier ................. G06F 17/5054
                                                    326/39
7,424,416 B1 *  9/2008 Cavanagh .......... G06F 17/5027
                                                    703/13
(Continued)

FOREIGN PATENT DOCUMENTS

CN          105354162 A      2/2016

OTHER PUBLICATIONS

InterNational Committee for Information Technology Standards (INCITS), "INCITS 513-201x, Information technology—SCSI Primary Commands—4 (SPC-4)," Jun. 3, 2014, Revision 37, <https://standards.incits.org/apps/group_public/download.php/57039/eb-2014-00339-Public-review-register-INCITS-513-201x-Comments-due-7-21-2014.pdf>.

(Continued)

*Primary Examiner* — Christopher B Shin
(74) *Attorney, Agent, or Firm* — Hewlett Packard Enterprise Patent Department

(57) ABSTRACT

Examples provided herein relate to hot plugging PCIe cards. For example, a field programmable gate array ("FPGA") communicably coupled to a PCIe bus may detect a new PCIe card physically connected to the PCIe bus. The FPGA may access configuration information stored by the FPGA that is associated with the PCIe bus. The FPGA may determine, based on the accessed configuration information, whether to facilitate connection of the new PCIe card to the PCIe bus. Responsive to determining that connection of the new PCIe card to the PCIe bus should be facilitated, the new PCIe card may be trained to communicate with the PCIe bus and an upstream device communicably coupled to the PCIe bus.

20 Claims, 3 Drawing Sheets

(52) U.S. Cl.
CPC .................. *G06F 2211/002* (2013.01); *G06F 2213/0026* (2013.01); *G06F 2213/4004* (2013.01)

(58) Field of Classification Search
USPC ........................................................ 710/302
See application file for complete search history.

(56) References Cited

U.S. PATENT DOCUMENTS

| | | | |
|---|---|---|---|
| 7,607,005 B1* | 10/2009 | Lewis | G06F 1/1626 713/1 |
| 7,836,238 B2 | 11/2010 | Freimuth et al. | |
| 7,877,521 B2 | 1/2011 | Suzuki et al. | |
| 7,934,033 B2 | 4/2011 | Malwankar | |
| 8,417,774 B2* | 4/2013 | Flynn | G06F 3/0613 709/204 |
| 8,443,126 B2 | 5/2013 | Elboim | |
| 8,782,317 B1 | 7/2014 | Du | |
| 8,949,502 B2* | 2/2015 | McKnight | G06F 1/30 710/22 |
| 9,262,363 B2 | 2/2016 | Luo et al. | |
| 2007/0043882 A1* | 2/2007 | Natarajan | G06F 9/4411 710/8 |
| 2007/0233928 A1 | 10/2007 | Gough | |
| 2010/0262979 A1* | 10/2010 | Borchers | G06F 9/544 719/321 |
| 2012/0185634 A1 | 7/2012 | Shirai et al. | |
| 2012/0198110 A1* | 8/2012 | Wang | G06F 13/4081 710/104 |
| 2014/0365704 A1* | 12/2014 | Yousuf | G06F 13/28 710/308 |
| 2015/0095712 A1* | 4/2015 | Han | G11C 29/1201 714/42 |
| 2015/0286602 A1* | 10/2015 | Buckland | G06F 13/4081 710/301 |
| 2016/0048192 A1* | 2/2016 | Matsunaga | G06F 3/0625 713/340 |
| 2016/0217098 A1 | 7/2016 | Chiu et al. | |
| 2017/0126487 A1* | 5/2017 | Xie | H04L 41/082 |

OTHER PUBLICATIONS

Cyrod Technologies, Inc., "PCT Express Expansion Backplane," (Research Paper), 2008, 3 pages, available at http://www.cyrod.com/Templates/PCI express expansion backplane.htm.
Herr, J. et al., "Hot Swapping the PCI Bus—Design Note 155," (Research Paper), 2015, 2 pages, available at http://cds.linear.com/docs/en/design-note/dn155fa.pdf.
Jahangiri, A., "PCI Express Hot Plug: A New Era of RAS," (Research Paper), Jul. 2, 2007, 4 pages, availabie at http://electronicdesign com/boards/pci-express-hot-plug-new-era-ras.
Linear Technology, "LTC1421—Hot Swap Controller," Jan. 31, 2017, (web page), <http://www.linear.com/product/LTC1421>.
Linear Technology, "LTC1421/LTC1421-2.5 Hot Swap Controller," 1996, <http://cds.linear.com/docs/en/datasheet/1421fc.pdf>.
Wikipedia, "Field-programmable gate array," May 17, 2017, <https://en.wikipedia.org/w/index.php?title=Field-programmable_gate_array&oldid=780855.
Wikipedia, "PCI Express," May 26, 2017, <https://en.wikipedia.org/w/index.php?title=PCI_Express&oldid=782336068>, 22 pages.

* cited by examiner

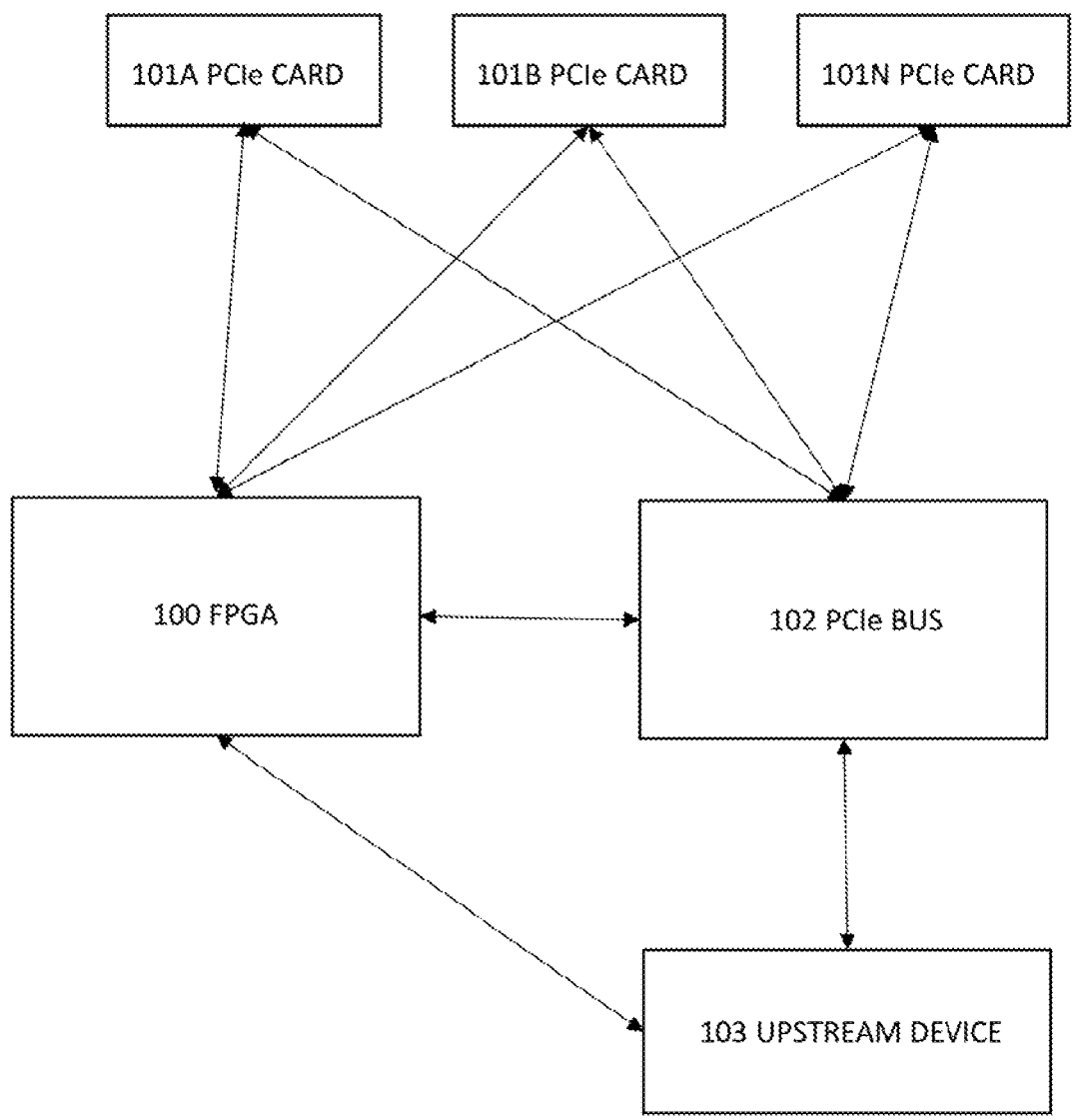

HOT PLUGGING PERIPHERAL CONNECTED INTERFACE EXPRESS (PCIE) CARDS

BACKGROUND

High availability and reliability have become highly desirable for many server and storage based systems. Add-in PCIe cards are desired to be hot plug capable to maintain highly available storage systems, so that failed PCIe cards can be replaced without turning the system off. A PCI Express bus is a high speed serial bus, with separate serial links that connect each connected device to a root complex of the system.

BRIEF DESCRIPTION OF THE DRAWINGS

The following detailed description references the drawings, wherein:

FIG. 1 is a block diagram depicting an example environment in which various examples may be implemented as a system that hot plugs PCIe cards.

DETAILED DESCRIPTION

Figure 1A:
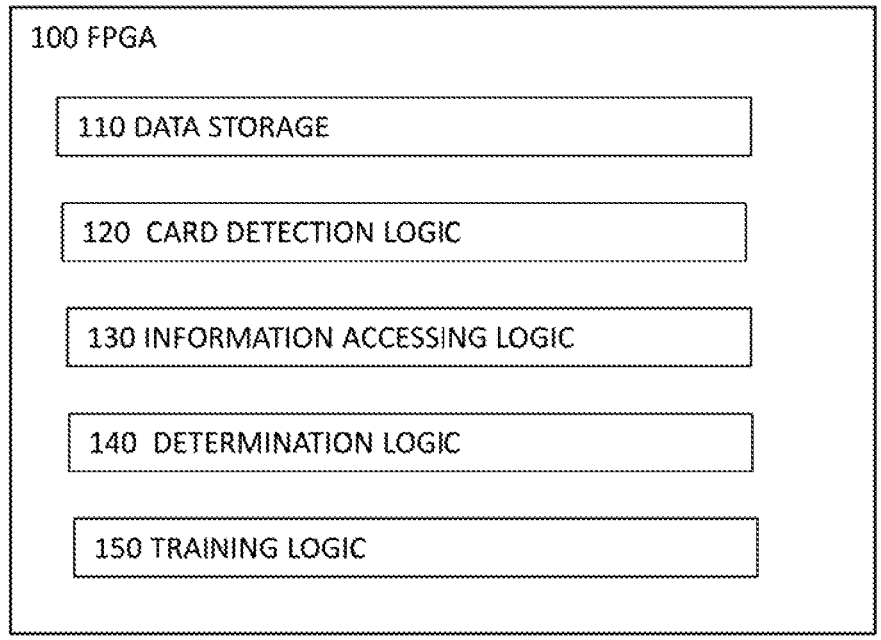
FIG. 1A is a block diagram depicting an example system for hot plugging PCIe cards.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

The foregoing disclosure describes a number of example implementations for hot plugging PCIe cards. The disclosed examples may include systems, devices, machine-readable storage media, and methods for hot plugging PCIe cards. For purposes of explanation, certain examples are described with reference to the components illustrated in FIGS. 1-3. The functionality of the illustrated components may overlap, however, and may be present in a fewer or greater number of elements and components.

Figure 2:
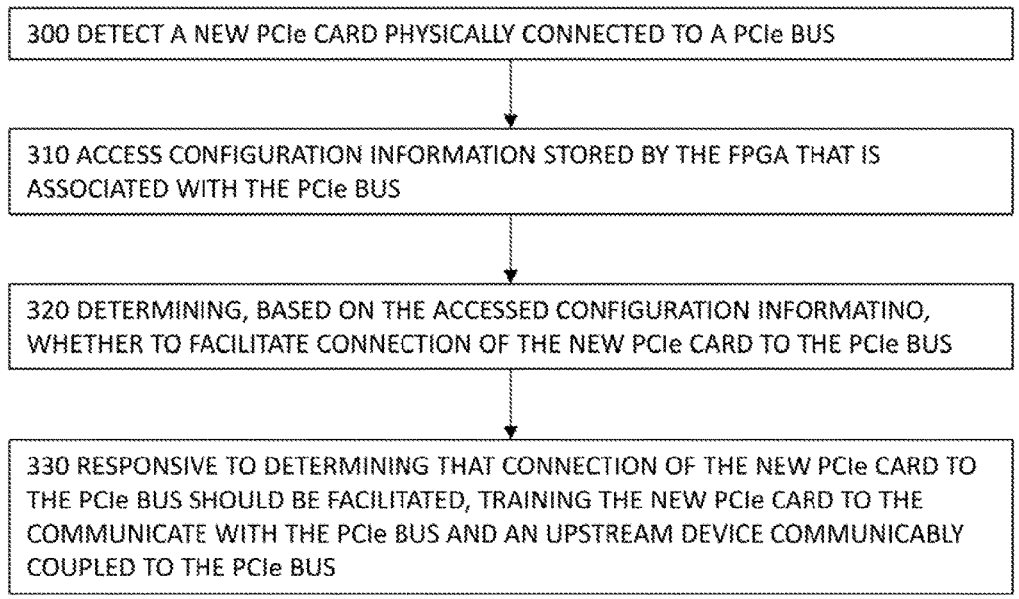
FIG. 2 is a flow diagram depicting an example method for hot plugging PCIe cards.
Figure 3:
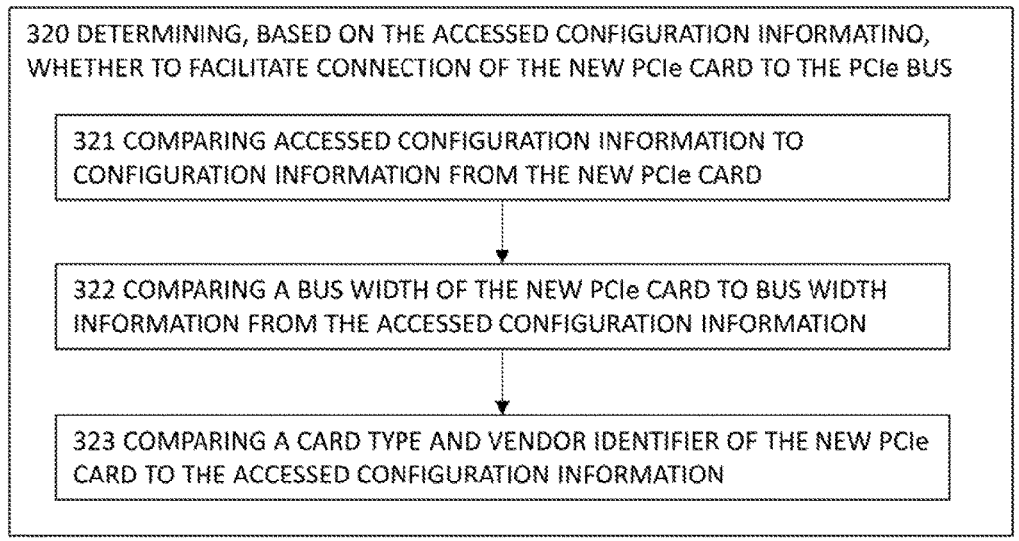
FIG. 3 is a flow diagram depicting an example method for hot plugging PCIe cards.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 2-3 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

High availability and reliability have become highly desirable for many server and storage based systems. Add-in PCIe cards being hot plug capable may be beneficial to maintain highly available storage systems, so failed cards can be replaced without turning the system off. A PCI Express bus is a high speed serial bus, with separate serial links that connect each connected device to a root complex of the system.

In some examples, a PCIe bus may be connected to a CPU of a storage system and to a set of PCIe cards. In such examples, an FPGA may manage the set of PCIe cards and the CPU.

When an add-in card has been inserted into an unpowered PCIe slot, a hot add request may be initiated to the hot plug controller, which is the power device that powers the PCIe card. In some examples, the hot plug controller may be an electronic fuse or other circuitry of the card.

In response to the hot add request, the FPGA may detect the card, reset the clocks of the CPU, and facilitate communication between the PCIe bus and the CPU of the storage system. The PCIe card is then trained for the system and put into use. A PCIe link between two devices can have anywhere from 1 to 32 lanes, and initialization of a PCIe card may auto-negotiate the highest mutually supported lane count.

Several technical challenges exist with connecting the PCIe card to a system that includes storage device(s), the CPU, the FPGA, and a PCIe bus. These challenges include hot plugging the PCIe card during operation of the system without a restart of the system, and validation of the PCIe card. The former challenge arises because the configuration of the PCIe card may be different from the configuration of the lanes of the PCIe bus to which the card is connected. This could result in the configuration registers associated with the PCIe card being changed, which involves a restart of the system. Restarting the system disrupts the availability and reliability that has become highly desirable for many server and storage based systems. The later challenge is related to the former challenge, in that the configuration of the PCIe card is unknown before it is physically hot plugged into the PCIe bus. Without validation, issues like errors, training of the upstream device to a different configuration, failure to connect, and restart of the system could occur.

A technical solution for these challenges is provided by storing configuration information for a PCIe card to be hot plugged into the system in the FPGA that detects the card and facilitates communication between the PCIe bus and the CPU of the storage device. In particular, configuration information for the strapping pins for a set of lanes of the PCIe bus are stored in the FPGA. The configuration information may include, for example, bus width, lanes of the PCIe bus to which the device connects, register information associated with the strapping pins, and/or other configuration information. Register information may include, for example, card type, bus ID, vendor ID, and/or other information associated with the connection and/or use of the PCIe card to the PCIe bus. By storing this information on the FPGA, the upstream device is able to access the strapping pins from the FPGA instead of the PCIe bus, and allows validation of a new card by the FPGA (which initially detects the card) and training of the card only if the validation occurs. This prevents a forced restart of the system as well, with the FPGA not initiating training of the card without the configuration information stored in the FPGA matching information from the card.

Examples discussed herein address these technical challenges by providing a technical solution that provides hot plugging PCIe cards. For example, the technical solution may detect, by a field programmable gate array ("FPGA") communicably coupled to a PCIe bus, a new PCIe card physically connected to the PCIe bus. The FPGA may access configuration information stored by the FPGA that is associated with the PCIe bus. The FPGA may determine, based on the accessed configuration information, whether to facilitate connection of the new PCIe card to the PCIe bus. Responsive to determining that connection of the new PCIe card to the PCIe bus should be facilitated, the new PCIe card may be trained to communicate with the PCIe bus and an upstream device communicably coupled to the PCIe bus.

FIG. 1 is an example environment in which various examples may be implemented as a system 10 that facilitates hot plugging PCIe cards. In some examples, the system 10 that facilitates hot plugging PCIe cards may include various components such as a field programmable gate array ("FPGA") 100, a set of PCIe cards (e.g., PCIe cards 101B, . . . , 101N), a PCIe bus 102, an upstream device 103, and/or other devices communicably coupled to the PCIe bus 102. In some examples, the PCIe bus 102 may be connected to a CPU of an upstream device 103 and to a set of PCIe cards 101A, . . . , 101N. An FPGA 100 may manage the set of PCIe cards 101A, . . . , 101N, the PCIe bus 102, the CPU of the upstream device 103, and/or other components of the system 10.

The FPGA 100 may detect a PCIe card (e.g., card 101A) that may be inserted into an unpowered slot of the PCIe bus 102. When an add-in card has been inserted into an unpowered PCIe slot. The FPGA 100 may control powering up, connecting, and facilitating training of the PCIe card (e.g., card 101A) for use with the upstream device (e.g., device 103) via the PCIe bus (bus 102) as well as controlling the clocks of the CPU of the upstream device (e.g., device 103) to allow connection of the PCIe card (e.g., card 101A).

Figure 1B:
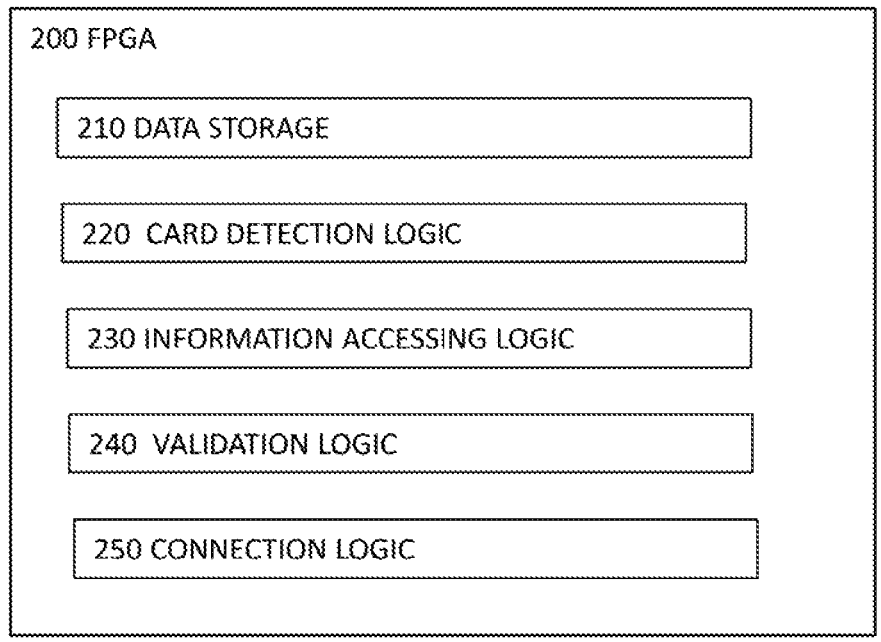
FIG. 1B is a block diagram depicting an example system for hot plugging PCIe cards.

A field programmable gate array (e.g., FPGA 100) may comprise an integrated circuit that includes a data storage, an array of programmable logic blocks and reconfigurable interconnects and/or other hardware device suitable for performing the functionality described in relation to FIG. 1A and FIG. 1B. In some examples, the data storage may comprise a non-transitory machine-readable storage medium and/or other memory elements (e.g., flip flops, memory blocks) that allow for storage of information from a set of PCIe cards and/or PCIEbus.

A PCIe bus (e.g., PCIe bus 102) may comprise, for example, a bus that uses the Peripheral Component Interconnect Express ("PCIe") standard. The PCIe standard comprises a high speed serial computer expansion bus standard with separate serial links that connect each connected device separately to a root complex that then connects to an upstream device. A PCIe bus communicates with a connected device via a PCIe link, which comprises a point-to-point communication channel between two PCIe ports that facilitate communication of data, requests, and interrupts. A PCIe link may comprise one or multiple lanes. A lane comprises two differential signaling pairs (one for receiving data and the other for transmitting data). As such, a lane may comprise four wires or signal traces to facilitate the two differential signaling pairs that may transport data packets in both directions between endpoints of a link.

The PCIe link between two devices can involve anywhere between 1 and 32 lanes of the PCIe bus, with initialization of the device usually auto-negotiating the highest mutually supported lane count between a connecting device connected via the link and the PCIe bus. With a multi-lane link, packet data between the connecting device and the PCIe bus may be striped across lanes. A bus width of the connecting device may comprise a number of lanes of the PCIe link. A PCIe bus enables a PCIe card to be inserted into a multi-lane slot that has more lanes than the PCIe card is capable of connecting to. Once a connecting device has connected to the PCIe bus, the PCIe bus stores configuration information about the card, including, for example, bus width, register information, and/or other information. The register information may include for example, device identifier, bus identifier, vendor identifier, driver identifier, and/or other information related to the connection and training of the device for use via the PCIe bus and the upstream device.

In some example, the connecting device to a PCIe bus is a PCIe card. A PCIe card (e.g., 101N) may comprise, for example, a set of slots for connection to the PCIe bus, an electronic circuit, integrated circuit, printed circuit board, power component, and/or other hardware component capable of executing functionality. In some examples, a PCIe card may also comprise memory, additional motherboard hardware, firmware, software, drivers, and/or other components suitable for executing the intended functionality of the PCIe card. In some examples, the PCIe card may comprise a solid state drive, a video card, an audio card, a wired or wireless network interface card, a hard drive controller, and/or other type of PCIe card suitable for use with system 10.

An upstream device (e.g., upstream device 103) may comprise, for example, a storage device, memory array, server, laptop, portable computing device, smart electronic device, and/or other hardware device that comprises a CPU and is communicably couplable to a PCIe bus.

According to various implementations, a system that facilitates hot plugging PCIe cards and the various components described herein may be implemented in hardware and/or a combination of hardware and programming that configures hardware. Furthermore, in FIG. 1 and other Figures described herein, different numbers of components or entities than depicted may be used. In some examples, a system 10 that facilitates hot plugging PCIe cards (e.g., cards 101A, . . . , 101N) may comprise a PCIe bus 102, a FPGA 100, an upstream device 103, and/or other devices. As shown in FIG. 1, a set of PCIe cards 101A, . . . , 101N may be physically connectable to a PCIe bus 102 and communicably couplable to a FPGA 100. The PCIe bus 102 may connect to an upstream device 103 to which it facilitates connection and use of the PCIe cards 101A, . . . , 101N. The FPGA 100 may be communicably coupled to the PCIe bus 102 and the upstream device 103 as well to perform at least the functionality described herein.

FIG. 1A is a block diagram depicting an example FPGA for facilitating hot plugging PCIe cards. In some examples, the example FPGA 100 may comprise the FPGA 100 of FIG. 1. FPGA, which facilitates hot plugging PCIe cards 101A, 101B, . . . , 101N, may comprise a data storage 110, card detection logic 120, information accessing logic 130, determination logic 140, training logic 150, and/or other components. The term "logic", as used herein, refers to a combination of hardware and programming that performs a designated function. In some examples, the logic of the FPGA may comprise one or multiple logic blocks of the FPGA.

Card detection logic 120 may detect a new PCIe card 101A physically connected to the PCIe bus 102. In some examples, the card detection logic 120 may detect the new PCIe card 101A responsive to a hot add request being initiated from a hot plug controller of the PCIe card 101A. The hot plug controller of the PCIe card 101A may comprise a power device that powers the PCIe card 101A. In some examples, the hot plug controller may comprise an electronic fuse and/or component that powers the PCIe card 101A. The hot add request of the PCIe card 101A may cause an event to be sent through a link to the PCIe bus 102 that results in an interrupt to the root complex of the PCIe bus 102. In some examples, the PCIe bus 102 may provide information about the connection of the new PCIe card 101A to the FPGA.

Information accessing logic 130 may access configuration information stored by the FPGA 100, where the configuration information is associated with the PCIe bus 102. The configuration information associated with the PCIe bus 102 may comprise information associated with the previous PCIe card that had connected to the lanes to which the new PCIe card 101A is connected. Responsive to connection of the previous PCIe card to the PCIe bus 102, the PCIe bus 102 and/or upstream device 103 may store configuration information related to the previous PCIe card. The FPGA may also store the configuration information. In some examples, the configuration information may comprise a bus width (e.g., a number of lanes which the previous PCIe card used), information from a set of port configuration strapping pins of the PCIe bus 102, and register information from the PCIe bus 102. The register information may comprise information from configuration registers that are loaded into the memory of the upstream device 103. The information from the configuration registers may also be stored in the data storage 110 of the FPGA.

As described further below, by using the configuration information to validate that the new PCIe card 101A is a same type of card as the previous PCIe card, the internal registers of the upstream device 103 will not have to be changed due to connection of the new PCIe card 101 (and thus another reason that might require restart of the system 10 is prevented). In some examples, the register information from the upstream may comprise, for example, card type, a bus identifier, PCIe card vendor identifier of a vendor of the previous PCIe card, PCIe bus vendor identifier of the vendor of the PCIe bus 102, upstream device vendor identifier of the vendor of the upstream device, driver information (e.g., for a driver used to facilitate use of the previous PCIe card with the upstream device 103), and/or other information stored in the upstream device 103 that may be used to facilitate use of a PCIe card.

The determination logic 140 may determine, based on the accessed configuration information, whether to facilitate connection of the new PCIe card 101A to the PCIe bus 102. The determination logic 140 may determine whether to facilitate connection based on one or multiple determinations, as described below.

In some examples, the determination logic 140 may determine whether to facilitate connection by comparing the accessed configuration information stored in the FPGA 100 to configuration information from the new PCIe card 101A. In some examples, the accessed configuration information may comprise information from a set of port configuration strapping pins of the PCIe bus 102 to which the new PCIe card 101A is connected, and comparing the accessed configuration information may comprise comparing a bus width used by the new PCIe card 101A to bus width information from the accessed configuration information.

In some examples, the determination logic 140 may determine whether to facilitate connection by comparing the accessed configuration information stored in the FPGA 100 to configuration information from the new PCIe card 101A. In some examples, the accessed configuration information may comprise register information, and comparing the accessed configuration information may comprise comparing some or all of the register information stored in the accessed configuration information to information from the PCIe card 101A.

In some examples, the determination logic 140 may use the determination to validate that the new PCIe card 101A can be connected to the PCIe bus 102. By comparing the accessed configuration information to the information from the new PCIe card 101, the determination logic 140 may validate that the new PCIe card 101A can be connected to the PCIe bus 102 without causing a restart of system 10 responsive to the comparison indicating that the information compared matches. Responsive to determining that the new PCIe card 101A cannot be validated (e.g., that the compared information does not match), the determination logic 140 may provide an indication that connection of the new PCIe card to the PCIe bus has failed.

The training logic 150 may train the new PCIe card 101A to communicate with the PCIe bus 102 and the upstream device 103 communicably coupled to the PCIe bus 102 responsive to determining that connection of the new PCIe card 101A to the PCIe bus 102 should be facilitated. The training logic 150 may determine the appropriate driver for the new PCIe card 101A based on a bus identifier, vendor ID of the PCIe card 101A, accessed configuration information, any combination thereof, and/or other information related to the new PCIe card 101A, PCIe bus 102, and upstream device 103. Responsive to determining the appropriate driver, the training logic 150 may facilitate loading the driver in the upstream device 103 to facilitate communication and use of the new PCIe card 101A. Responsive to loading the driver, the upstream device 103 may be enabled to use the new PCIe card 101A. In some examples, the training logic 150 may also provide configuration information from the new PCIe card 101A to the PCIe bus 102 and the upstream device 103. The training logic 150 may also cause storage information of configuration information from the new PCIe card 101A, PCIe bus 102, and upstream device 103 to replace the stored configuration information in the data storage 110.

In performing their respective functions, logic 120-150 may access data storage 110 and/or other suitable storage medium(s). In some examples, data storage 110 may comprise memory blocks integrated into the FPGA that latch information from the PCIEbus 102 and/or the set of PCIe cards 101A, . . . , 101N. Data storage 110 may store a plurality of types of data to be accessible to FPGA 100 and facilitate the functionality described herein.

FIG. 1B is a block diagram depicting an example FPGA 200 that facilitates hot plugging PCIe cards. In some examples, example FPGA 200 may comprise FPGA 100 of FIG. 1. FPGA 200, which may facilitate hot plugging PCIe cards may comprise a data storage 210, card detection logic 220, information accessing logic 230, validation logic 240, connection logic 250, and/or other components suitable for facilitating the functionality described herein.

Card detection logic 220 may detect a new PCIe card 101A that is physically connected to the PCIe bus 102. In some examples, the card detection logic 220 may detect the new PCIe card 101A in a manner similar or the same as that described above in relation to the execution of the card detection logic 120.

Information accessing logic 230 may access configuration information associated with the PCIe bus 102 from a data storage of the FPGA 100. In some examples, the information accessing logic 230 may access the configuration information in a manner the same as or similar to information accessing logic 130.

Validation logic 240 may validate the new PCIe card 101A based on the accessed configuration information. In some examples, the validation logic 240 may validate the new PCIEcard 101A in a manner the same as or similar to determination logic 140.

Connection logic 250 may facilitate connection of the new PCIe card 101A to the PCIe bus 102 responsive to validating the new PCIe card 101A. In some examples, connection logic 250 may facilitate connection of the new PCIe card 101A in a manner the same as or similar to training logic 150.

In some examples, the logic 120-150 of FPGA 100 may perform the functionality of logic 220-250. In performing their respective functions, logic 220-250 may access data storage 210 and/or other suitable storage medium(s). In some examples, data storage 210 may comprise memory blocks integrated into the FPGA 200 that latch information from the PCIEbus 102 and/or the set of PCIe cards 101A, . . . , 101N. Data storage 210 may store a plurality of types of data to be accessible to FPGA 200 and facilitate the functionality described herein.

FIG. 2 is a flow diagram depicting an example method for hot plugging PCIe cards. The various processing blocks and/or data flows depicted in FIG. 2 (and in the other drawing figures such as FIG. 3) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, the method of FIG. 2 as illustrated (and described in greater detail below) is meant be an example and, as such, should not be viewed as limiting. The method of FIG. 2 may be implemented in the form of logic executable by the FPGA 100, and/or in the form of electronic circuitry.

In an operation 300, a new PCIe card may be detected as being physically connected to a PCIe bus. For example, the FPGA 100 (and/or the card detection logic 120, card detection logic 220, or other resource of the FPGA 100) may detect the new PCIe card. The FPGA 100 may detect the new PCIe card in a manner similar or the same as that described above in relation to the execution of the card detection logic 120, card detection logic 220, and/or other resource of the FPGA 100.

In an operation 310, configuration information that is associated with the PCIe bus and stored by the FPGA may be accessed. For example, the FPGA 100 (and/or the information accessing logic 130, information accessing logic 230, and/or other resource of the FPGA 100) may access the configuration information. The FPGA 100 may access the configuration information in a manner similar or the same as that described above in relation to the execution of the information accessing logic 130, information accessing logic 230, and/or other resource of the FPGA 100.

In an operation 320, a determination may be made, based on the accessed configuration information and by the FPGA, on whether to facilitate connection of the new PCIe card to the PCIe bus. For example, the FPGA 100 (and/or the determination logic 140, validation logic 240, and/or other resource of the FPGA 100) may determine whether to facilitate connection of the new PCIe card to the PCIe bus. The FPGA 100 may determine whether to facilitate connection of the new PCIe card to the PCIe bus in a manner similar or the same as that described above in relation to the execution of the determination logic 140, validation logic 240, and/or other resource of the FPGA 100.

In some examples, the determination as to whether to facilitate connection of the new PCIe card to the PCIe bus may comprise one or multiple operations. FIG. 4 depicts various example operations 321, 322, and 323, which may be performed independently or in conjunction with each other and/or other operations to make the determination of operation 320.

In an operation 321, accessed configuration information stored at the FPGA may be compared to configuration information from the new PCIe card. For example, the FPGA 100 (and/or the determination logic 140, validation logic 240, and/or other resource of the FPGA 100) may compare the accessed configuration information to configuration information from the new PCIe card. The FPGA 100 may compare the accessed configuration information to configuration information from the new PCIe card in a manner similar or the same as that described above in relation to the execution of the determination logic 140, validation logic 240, and/or other resource of the FPGA 100.

In an operation 322, a bus width of the new PCIe card may be compared to bus width information from the accessed configuration information. In some examples, any of the configuration information associated with the PCIe bus and stored at the FPGA may be compared with information from the new PCIe card. For example, the FPGA 100 (and/or the determination logic 140, validation logic 240, and/or other resource of the FPGA 100) may compare the bus width information. The FPGA 100 may compare the bus width information in a manner similar or the same as that described above in relation to the execution of the determination logic 140, validation logic 240, and/or other resource of the FPGA 100.

In an operation 323, a card type and vendor identifier of the new PCIe card may be compared to the accessed configuration information. In some examples, any of the register information included in the configuration information associated with the PCIe bus and stored at the FPGA may be compared with information from the new PCIe card. For example, the FPGA 100 (and/or the determination logic 140, validation logic 240, and/or other resource of the FPGA 100) may compare the card type and vendor identifier of the new PCIe card to the accessed configuration information. The FPGA 100 may compare the card type and vendor identifier of the new PCIe card to the accessed configuration information in a manner similar or the same as that described above in relation to the execution of the determination logic 140, validation logic 240, and/or other resource of the FPGA 100.

Returning to FIG. 2, in an operation 330, the new PCIe card may be trained to communicate with the PCIe bus and the upstream device communicably coupled to the PCIe bus, responsive to determining that the connection of the new PCIe card to the PCIe bus should be facilitated. For example, the FPGA 100 (and/or the training logic 150, connection logic 150, and/or other resource of the FPGA 100) may train the new PCIe card. The FPGA 100 may train the new PCIe card in a manner similar or the same as that described above in relation to the execution of the training logic 150, connection logic 150, and/or other resource of the FPGA 100.

The foregoing disclosure describes a number of example implementations for hot plugging PCIe cards. The disclosed examples may include systems, devices, computer-readable storage media, and methods for hot plugging PCIe cards. For purposes of explanation, certain examples are described with reference to the components illustrated in FIGS. 1-3. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 2-3 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order.

Thus, the present disclosure merely sets forth possible examples of implementations, and many variations and modifications may be made to the described examples. All such modifications and variations are intended to be included within the scope of this disclosure and protected by the following claims. All of the features disclosed in this specification (including any accompanying claims, abstract and drawings), and/or all of the elements of any method or process so disclosed, may be combined in any combination, except combinations where at least some of such features and/or elements are mutually exclusive.

The invention claimed is:

1. A method for hot plugging Peripheral Component Interconnect Express ("PCIe") cards, the method comprising:
   detecting, by a field programmable gate array ("FPGA") communicably coupled to a PCIe bus, a new PCIe card physically connected to the PCIe bus;
   accessing, by the FPGA, configuration information stored by the FPGA that is associated with the PCIe bus;
   determining, based on the accessed configuration information and by the FPGA, whether to facilitate connection of the new PCIe card to the PCIe bus; and
   responsive to determining that connection of the new PCIe card to the PCIe bus should be facilitated, training the new PCIe card to communicate with the PCIe bus and an upstream device communicably coupled to the PCIe bus.

2. The method of claim 1, wherein determining whether to facilitate connection comprises:
   comparing the accessed configuration information to configuration information from the new PCIe card.

3. The method of claim 2, wherein the accessed configuration information comprises information from a set of port configuration strapping pins of the PCIe bus to which the new PCIe card is physically connected, and wherein comparing the accessed configuration information to the configuration information from the new PCIe card comprises:
   comparing a bus width of the new PCIe card to bus width information from the accessed configuration information.

4. The method of claim 2, wherein the accessed configuration comprises register information from the PCIe bus, the register information comprising a card type, a bus identifier, and a vendor identifier, and wherein the training comprises:
   using the register information from the PCIe bus to facilitate connection of the new PCIe card to the PCIe bus.

5. The method of claim 1, wherein the training comprises:
   providing, by the FPGA, configuration information from the new PCIe card to the upstream device.

6. The method of claim 5, wherein the training comprises:
   determining a driver for the new PCIe card using PCIe bus information and configuration information; and
   loading the driver in the upstream device.

7. The method of claim 1, further comprising:
   responsive to determining that connection of the new PCIe card to the PCIe bus should not be facilitated, indicating that the new PCIe card is not connectable to the PCIe bus.

8. The method of claim 1, further comprising:
   responsive to determining that connection of the new PCIe card to the PCIe bus should be facilitated, storing, by the FPGA, configuration information from the new PCIe card in a data storage of the FPGA.

9. A field-programmable gate array ("FPGA") for hot plugging Peripheral Component Interconnect Express ("PCIe") cards, the FPGA comprising logic executable by the FPGA to cause the FPGA to:
   detect a new PCIe card physically connected to the PCIe bus;
   access, from a data storage of the FPGA, configuration information associated with the PCIe bus;
   validate the new PCIe card based on the accessed configuration information; and
   responsive to validating the new PCIe card, facilitate connection of the new PCIe card to the PCIe bus.

10. The FPGA of claim 9, wherein the logic is executable to cause the FPGA to:
    responsive to the new PCIe card not being validated, indicate that the new PCIe card is not connectable to the PCIe bus.

11. The FPGA of claim 9, wherein the logic to validate the new PCIe card comprises logic executable to cause the FPGA to:

compare the accessed configuration information to configuration information obtained from the new PCIe card.

12. The FPGA of claim 11 wherein the accessed configuration information comprises information from port configuration strapping pins of the PCIe bus to which the new PCIe card is physically connected, and wherein the logic to compare the accessed configuration information to the configuration information from the new PCIe card comprises logic executable to cause the FPGA to:
   compare a bus width of the new PCIe card to bus width information from the accessed configuration information.

13. The FPGA of claim 11, wherein the accessed configuration information comprises register information from the PCIe bus, the register information comprising a card type, bus identifier, and vendor identifier, and wherein the logic executable to facilitate connection with the PCIe bus comprises logic executable to cause the FPGA to:
   use the register information from the PCIe bus to facilitate connection of the new PCIe card to the PCIe bus.

14. The FPGA of claim 9, wherein the logic to facilitate connection with the PCIe bus comprises logic executable to cause the FPGA to:
   provide configuration information from the new PCIe card to an upstream device connected to the PCIe bus;
   determine a driver for the new PCIe card using PCie bus information and configuration information; and
   load the driver in the upstream device.

15. A system for hot plugging Peripheral Component Interconnect Express ("PCIe") cards, the system comprising:
   a PCIe bus communicably coupled to an upstream device;
   a field-programmable gate array ("FPGA") comprising logic executable by the FPGA to cause the system to:
   detect a new PCIe card physically connected to the PCIe bus;
   access, from a data storage of the FPGA, configuration information associated with the new PCIe bus;
   validate the new PCIe card based on the accessed configuration information;
   responsive to validating the new PCIe card, facilitate connection of the new PCIe card to the PCIe bus; and
   responsive to determining that the new PCIe card cannot be validated, indicate that connection of the new PCIe card to the PCIe bus has failed.

16. The system of claim 15, wherein the logic to validate the new PCIe card comprises logic executable by the FPGA to:
   compare the accessed configuration information to configuration information obtained from the new PCIe card.

17. The system of claim 16, wherein the accessed configuration information comprises information from port configuration strapping pins of the PCIe bus to which the new PCIe card is physically connected, and wherein the logic to compare the accessed configuration information to the configuration information from the new PCIe card comprises logic executable by the FPGA to:
   compare a bus width of the new PCIe card to bus width information from the accessed configuration information.

18. The system of claim 16, wherein the accessed configuration comprises register information from the PCIe bus, the register information comprising a card type, bus identifier, and vendor identifier,
   wherein the logic to validate the new PCIe card comprises logic executable by the FPGA to:
      determine whether the register information matches information from the new PCIe card, and
   wherein the logic to facilitate connection with the PCIe bus comprises logic executable by the FPGA to:
      use the register information from the PCIe bus to facilitate connection of the new PCIe card to the PCIe bus.

19. The system of claim 15, wherein the logic to facilitate connection with the PCIe bus comprises logic executable by the FPGA to:
   provide configuration information from the new PCie card to an upstream device connected to the PCIe bus.

20. The system of claim 19, wherein the logic to facilitate connection with the PCIe bus comprises logic executable by the FPGA to:
   determine a driver for the new PCIe card using PCIe bus information and configuration information; and
   load the driver in the upstream device.

* * * * *